Aug. 27, 1929.　　　A. VANDERVELD　　　1,725,771

CLOTH MEASURING AND COMPUTING MACHINE

Filed June 4, 1923　　　5 Sheets-Sheet 1

INVENTOR
ANTHONY VANDERVELD
BY
Frank E. Liverance, Jr.
ATTORNEY.

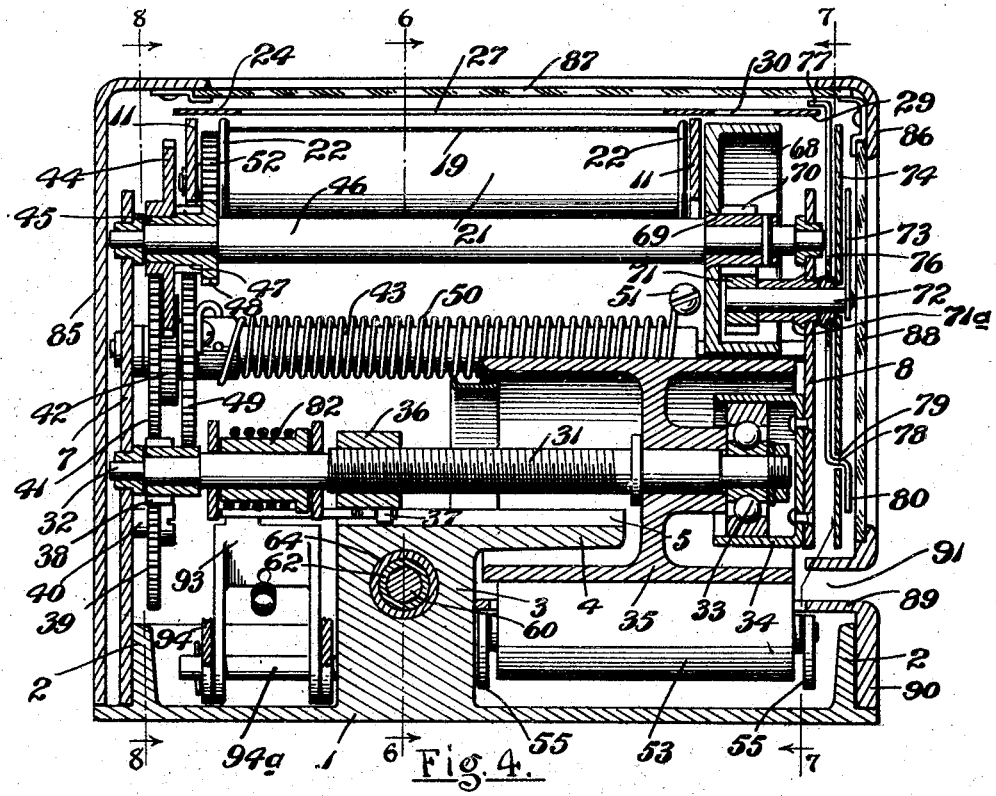
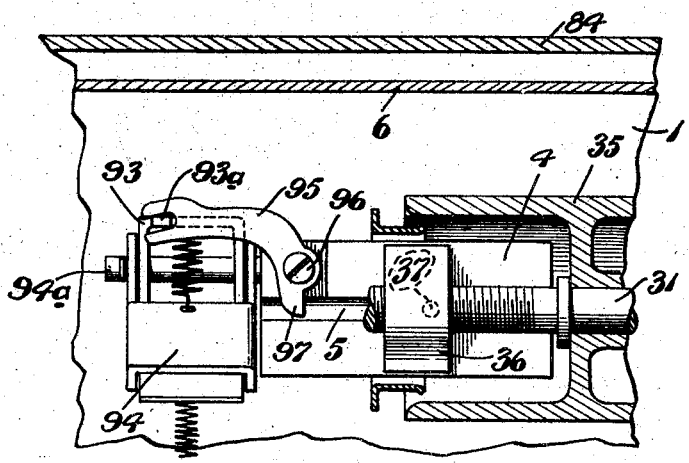

Aug. 27, 1929.  A. VANDERVELD  1,725,771

CLOTH MEASURING AND COMPUTING MACHINE

Filed June 4, 1923   5 Sheets-Sheet 3

INVENTOR
ANTHONY VANDERVELD
BY Frank E. Liverance, Jr.
ATTORNEY.

INVENTOR
ANTHONY VANDERVELD
BY Frank E. Liverance, Jr.
ATTORNEY.

Aug. 27, 1929.　　　A. VANDERVELD　　　1,725,771
CLOTH MEASURING AND COMPUTING MACHINE
Filed June 4, 1923　　　5 Sheets-Sheet 5

INVENTOR
ANTHONY VANDERVELD.
By Frank E. Liverance, Jr.
ATTORNEY

Patented Aug. 27, 1929.

1,725,771

UNITED STATES PATENT OFFICE.

ANTHONY VANDERVELD, OF GRAND RAPIDS, MICHIGAN.

CLOTH MEASURING AND COMPUTING MACHINE.

Application filed June 4, 1923. Serial No. 643,201.

This invention relates to a combined cloth measuring and computing machine. I heretofore filed an application on January 28, 1921, Serial No. 440,578, which resulted in Patent No. 1,420,612, issued June 20, 1922, for measuring and computing machine in which the subject matter of the present invention is disclosed. The present invention relates to the novel combination of the measuring mechanism and particularly, the indicating of the measurement of goods passed combined with computing chart used therewith whereby the clerk operating the machine may see both the quantity of goods measured and passed through the machine and the price thereof computed for immediate taking from the computing chart, together with means for showing the customer the quantity of the goods measured. It further relates to novel constructions whereby the chart is mounted and assembled in the machine in a particularly simple and perfected manner. These and various other objects and purposes with novel constructions and arrangements of parts for effecting the same will be clear as understanding of the invention is had from the following description, taken in connection with the accompanying drawings, in which, Fig. 1 is a plan view of the machine of my invention.

Fig. 4 is a longitudinal vertical section through the machine taken substantially midway between the sides thereof.

Fig. 5 is a fragmentary horizontal section through the machine at a plane directly above the axis of the measuring roller.

Figure 7:
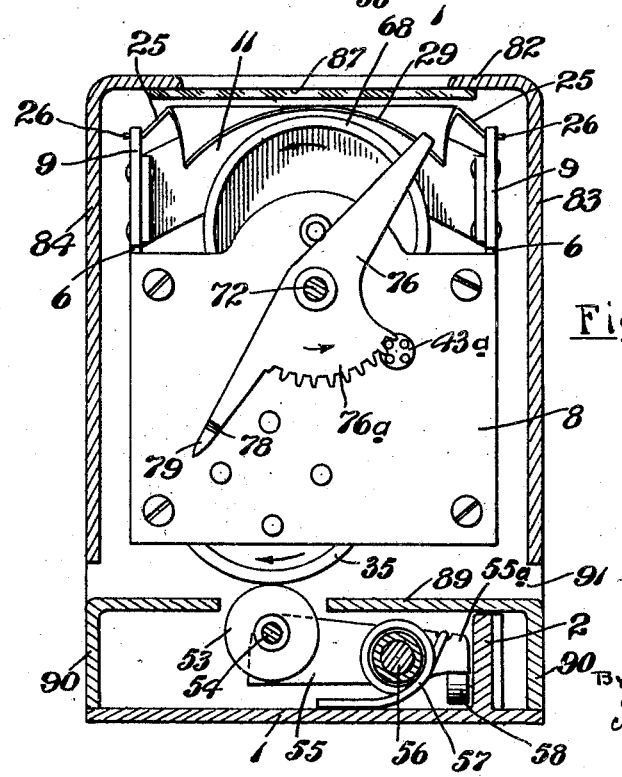
Figure 8:
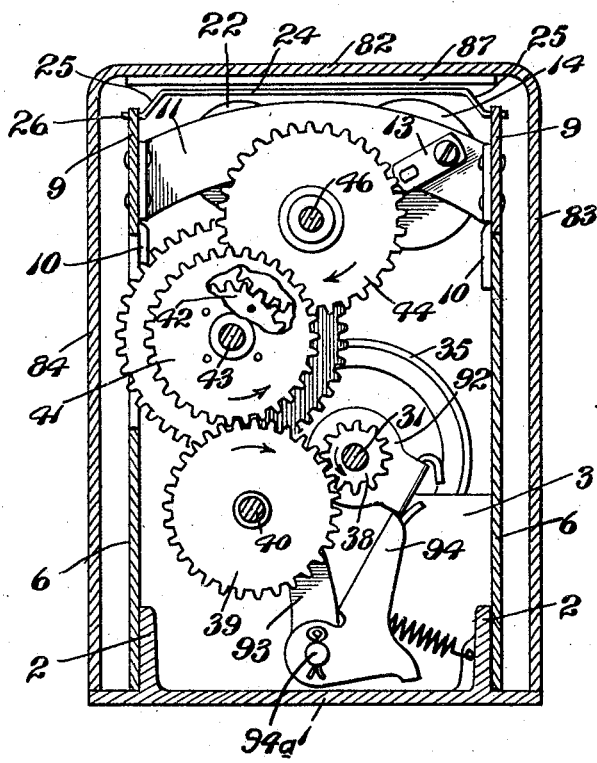

Figs. 7 and 8 are like sections on the planes of lines 7—7 and 8—8 of Fig. 4, respectively.

Figure 9:
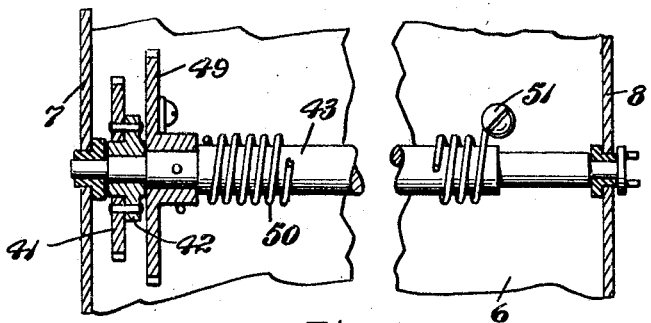

Fig. 9 is a fragmentary longitudinal vertical section showing the spring motor shaft of the machine.

Figure 10:
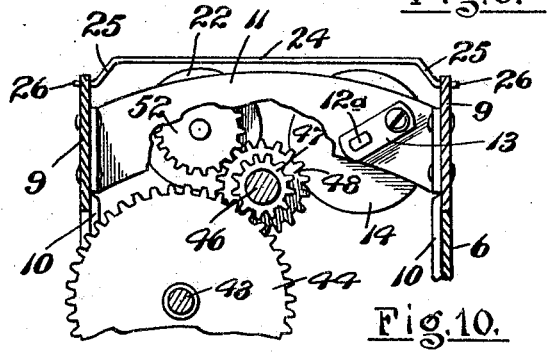

Fig. 10 is a fragmentary transverse vertical section through the machine with some parts broken away, the section being taken a short distance in front of the plane of line 8—8, of Fig. 4.

Figure 11:
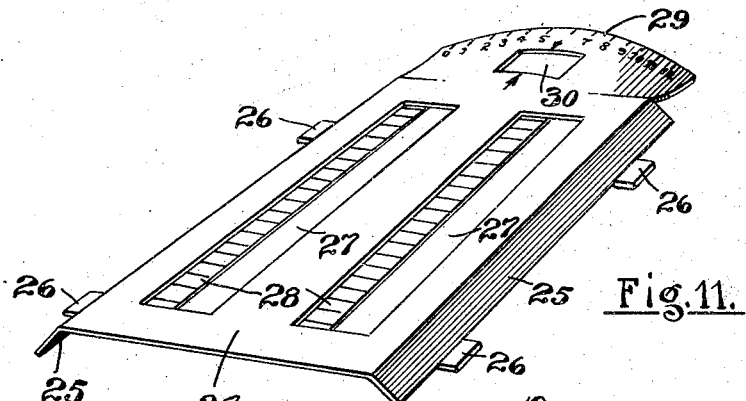

Fig. 11 is a perspective view of the upper cover plate for the price indicating mechanism.

Figure 12:
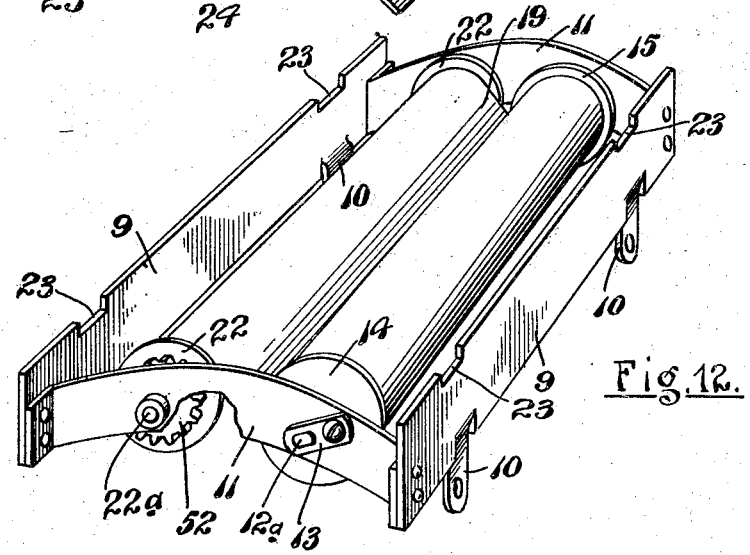
Figure 13:
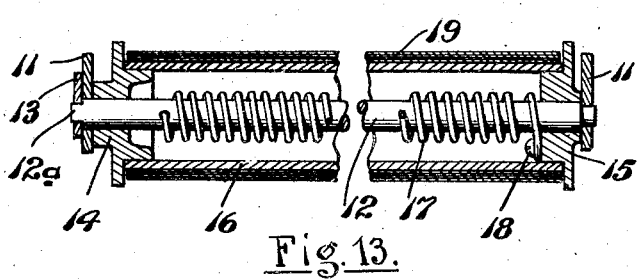

Fig. 12 is a perspective view of the price indicating chart and mechanism for mounting the same, and Fig. 13 is a longitudinal section through one of the rollers on which the price chart is wound.

Like reference characters refer to like parts in the different figures of the drawings.

In the construction of the machine, a base 1 is used from which, adjacent its sides and ends, upwardly extending integral flanges 2 project and intermediate its ends and transversely thereof a solid post 3 extends upwardly, at its upper end being formed with a forwardly extending member 4 in the upper side of which a horizontal groove 5 is cut which extends from the front end of the member 4 to the rear side of the post 3.

Two side plates 6 are secured at their lower portions to the side flanges 2 and extend upwardly therefrom. A rear or back plate 7 is connected to the back flange 2 and extends upwardly and lies between the side plates 6; while a front plate 8 lies between the plates 6 at their front ends, at its lower edge terminating a distance above the bottom plate 1, being secured to and held in place by the side plates 6. These plates 6, 7 and 8 make a frame work which serves as a support for the mechanism of the machine and for the computing chart.

Figure 6:
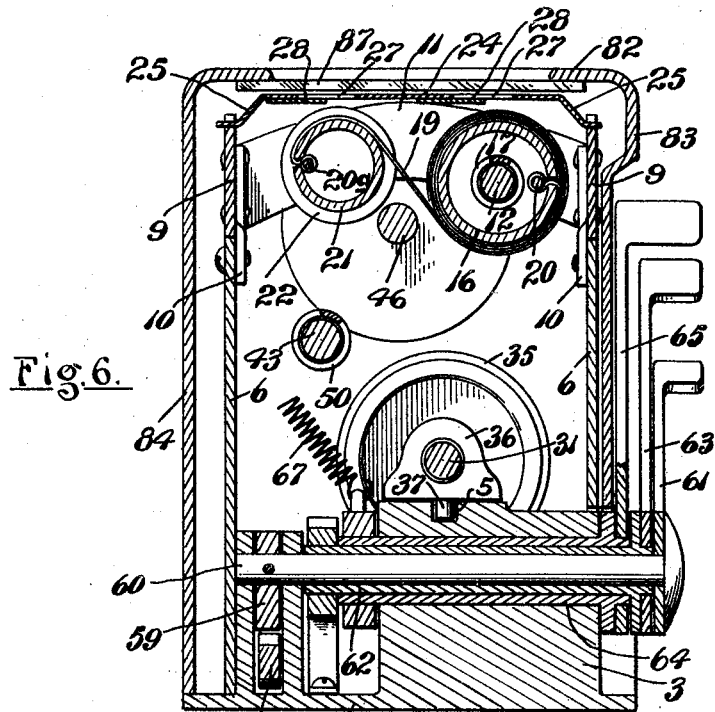
Fig. 6 is a vertical transverse section on the plane of line 6—6 of Fig. 4.

In carrying the computing chart, an upper detachable frame is provided, including parallel spaced apart sides 9 and connecting spaced apart ends 11 (see Fig. 12) permanently secured together. From the sides 9 depending tongues 10 extend and are adapted to pass on the inner sides of the side plates 6, being connected thereto with the sides 9 making in effect an upper extension to the side plates 6 as shown in Fig. 6. A shaft 12 is located between the ends 11 and passes through the same, at one end having a portion 12ª flattened and received in an opening in a holding member 13 secured to the adjacent end member 11 to serve as a lock against rotation of the shaft. Two heads 14 and 15 are loosely mounted on the shaft 12 in spaced apart relation and between the same a hollow roller or cylinder 16 is secured, the two heads and the cylinder making one of the rollers on which the computing chart is wound. A spring 17 is located around the shaft 12 and attached thereto at one end, at its other end being fastened to the head 15, it being evident that the spring is wound and tensioned with the rotation of the roller in one direction, the force of the spring tending to rotate the roller in the opposite direction when free to do so.

A chart is adapted to be wound on the roller 16, at its end passing through a slot in the roller and held from disengagement by a rod 20 passing through a looped end in the chart formed inside of the roller (see Fig. 6). The chart at its other end is similarly connected with a second roller 21 by means of a rod 20ª, said second roller paralleling the first roller 16. In the ends of the roller 21, heads 22 are permanently secured and formed with pintles 22ª (see Fig. 12) which pass through and are rotatably mounted in the end members 11 of the chart carrying frame. It is clear that the spring 17 serves normally to wind the chart on the first roller 16 and that when the roller 21 is driven to wind the chart on it, as will be later described, the spring is given greater tension so as to act to positively cause the rewinding of the chart on the first roller when free to do so.

In the upper edges of the sides 9 of the chart carrying frame, spaced apart notches 23 are cut, as shown in Fig. 12. A covering plate 24 of thin sheet metal is located above the chart and its frame, at its side edges having downwardly and outwardly extending portions 25 from which lips 26 extend outwardly to be received in the notches 23 so as to properly locate this plate over the chart. Two longitudinal and parallel slots 27 are cut in the plate and on the under side of the plate adjacent each slot a member of thin material, as indicated at 28, is secured, at one edge portion extending partly across the slot or opening 27. The members 28 are designed to carry a plurality of price indications indicating the many different prices per unit of measurement at which goods may be sold, this in itself being old and well known in the art to be used in conjunction with prices computed and printed on the chart to correspond therewith for the different lengths of goods measured.

At its front end, the plate 24 is formed with an integral extension 29 curved in the arc of a circle of relatively long radius. At the edge of the portion 29, a scale comprising a consecutive series of equally spaced divisions and numerals to correspond is provided, as shown in Fig. 11. Back of this scale a rectangularly shaped opening 30 is made through the plate, as shown, for a purpose to be later described.

A shaft 31 threaded at its intermediate portion has a reduced end 32 received in a bearing carried by the rear plate 6 and at its front end is mounted in a roller bearing 33 in a cup-like housing 34 permanently connected to and at the rear side of the front plate 8 of the supporting frame. This shaft is located horizontally a short distance above the upper end of the post 1 and the forward extension 4 thereto. A roller, 35, hereinafter termed the measuring roller, is fixed on shaft 31 at its front portion. A nut 36 is mounted on the threaded portion of the shaft 31 and at its under side is provided with a downwardly projecting pin 37 which is received in and is adapted to traverse the slot or groove 5 in the member 4 and upper end of the post 3 as the shaft is rotated.

A pinion 38 is fixed on shaft 31 near its rear end and is in mesh with a gear 39 idly mounted on a stud 40 carried by the plate 7. Gear 39 drives a gear 41 which together with a smaller gear 42 pinned to it is loosely mounted on a shaft 43 located above and paralleling the shaft 31 and rotatably mounted at its ends in the rear and front plates 7 and 8. Gear 42 is in mesh with and drives a gear 44 fixed on the end of a sleeve 45 mounted on and secured to a shaft 46 mounted in and between the plates 7 and 8. On this sleeve 45 two pinions 47 and 48 are formed, the former of which is located back of the latter and is in mesh with a gear 49 pinned to the shaft 43 heretofore described. A coiled spring 50 is placed around the shaft 43 at one end having attachment to the gear 49 and at the other being secured, at 51, to any suitable relatively stationary part of the machine. Pinion 48 is in mesh with a pinion 52 (see Figs. 10 and 12) secured to one of the heads 22 of roller 21. When the measuring roller 35 is turned in one direction with a consequent rotation of shaft 31 the gearing connections outlined serve to turn roller 21 so as to wind the chart 19 thereon from the roller 16 and increase the torsion in the spring 50 as well as in the spring 17. At the same time the nut 36 moves forward on the shaft 31. As soon as the roller 35 is free for return movement the spring 50 acts to return the parts to initial starting position, and spring 17 rewinds the chart on the roller 16.

Figure 1:
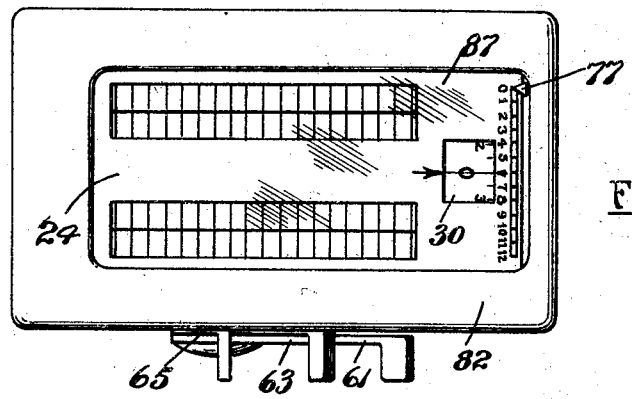
Figure 2:
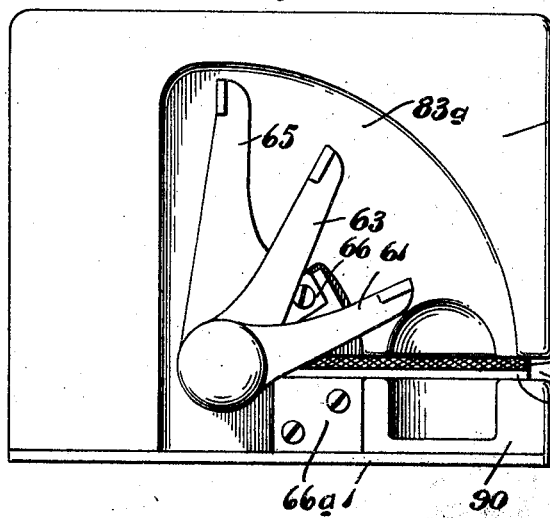
Fig. 2 is a side elevation thereof.

Associated with the measuring roller and mounted directly under the same is a presser roller 53 carried on a shaft 54 passing therethrough and which is mounted on and between two arms 55 which project from a sleeve mounted on a rod or shaft 56 as shown in Fig. 7. A spring 57 normally acts to force the presser roller against the measuring roller. The same may be moved away from the measuring roller through a lever 58 having one end positioned under an extension 55ª to one of the arms 55 and operated by a cam member 59 over the other end of the lever and which is secured to a shaft 60. This shaft is rotatably mounted in a sleeve 62 and extends to a side of the machine, at its end being equipped with an operating lever 61. Sleeve 62 is likewise equipped with an operating lever 63 closely adjacent the lever 61 and in turn is rotatably mounted in a sleeve 64 which passes through and is rotatably mounted in the post 3 (see Fig. 6). An operating handle or lever 65 is secured at the outer end of the sleeve 64 and carries a cutting knife 66 adapted to cooperate with a second knife 66ᵃ located below it to notch or sever the cloth passed through the machine at one edge whenever the lever 65 is depressed. The lever is normally held in its upper position, shown in Fig. 2, by a spring 67 attached to the inner end of the sleeve 64 and any suitable stationary part of the machine. The lever 63 is for operating the brake setting mechanism, not shown in the present application as it is fully disclosed in my patent above mentioned.

Adjacent the front end of the shaft 46 a drum 68 is located so as to pass directly under the opening 30 in the part 29 of plate 24, being fixed on a sleeve 69 which in turn is connected to the shaft 46. A pinion 70 is formed on the sleeve 69 which drives a second pinion 71 (see Fig. 4) secured at the rear end of a short shaft 72 which is mounted for rotation in a short sleeve 71ᵃ carried on the front plate 8. At its front end, shaft 72 is equipped with a hand 73, located in front of a vertical plate 74 on which a dial 75 is placed carrying a scale to indicate fractional parts of a unit of measurement as the hand passes thereover. The relation of the measuring roller and the gearing is such that when a unit length of goods has passed between the measuring and presser rollers, serving to drive the measuring roller, shaft 46 is turned through exactly one complete revolution and hand 73 is turned through one complete turn. The drum 68 is visible through the opening 30 from above for the clerk to see and the hand and dial from in front for the customer, it being apparent that the drum may be equipped with a proper fractional scale to indicate the fractional parts of a unit of measurement of the goods passed through the machine for the clerk to see.

Figure 3:
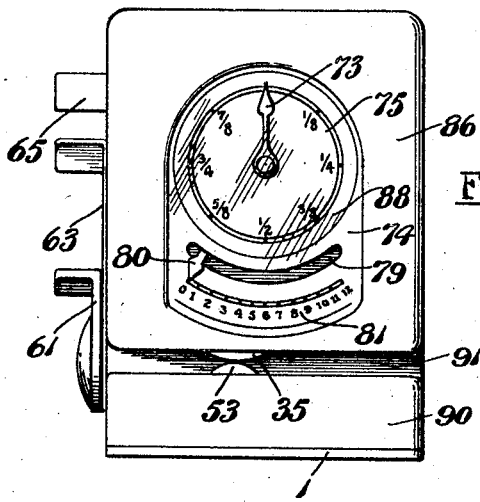
Fig. 3 is a front elevation thereof.

A bar 76 carries a hub between its ends which is rotatably mounted on the shaft 72 back of the hand 73. Said bar extends upwardly at one end and at its upper end is turned to the rear making a pointer 77 to pass over the scale on the upper side of the part 29. At its lower portion it is bent forwardly and then downwardly, making an offset portion 78 passing through a curved slot 79 in the plate 74 with a pointer 80 to cooperate with a scale 81 (see Fig. 3) formed in a plurality of equally spaced divisions numbered in consecutive order. The bar 76 has an arc shaped enlargement 76ᵃ (see Fig. 7) in which gear teeth are cut at the edge thereof to be actuated by the pins projecting from a small head 43ᵃ at the front end of shaft 43, it being designed that the shaft 43 turns with such speed that with every unit length of goods passed through and actuating the measuring roller, the bar 76 shall be moved so that its upper pointer 77 passes from one numeral on the upper scale to the next higher numeral, and the pointer 80 from one numeral on the scale 81 to the next higher, giving both the clerk and customer an indicating means from which to determine the quantity of goods measured in units and fractions of units of measurement.

The mechanism described is designed to be enclosed in a covering casing having a top 82, sides 83 and 84, a back 85 and a front 86 which extends to a point slightly below the lower part of the measuring roller. A glass plate 87 is located against the under side of the top which has an opening cut therethrough for the price computations on the chart and numbers and fractions on the part 29 and drum 68 to be visible through the glass, and the front 86 likewise has an opening therein which is closed by a glass plate 88 so that the dial, hand, pointer 80 and scale 81 are readily seen. Below the measuring roller, a table 89 with depending sides 90 covers the presser roller mechanism, the table being provided with an opening in its upper side for the passage of the presser roller partly therethrough, a horizontal slot 91 for entrance of the cloth between the two rollers being made as shown.

With cloth or like material between the measuring and presser rollers, the same may be drawn lengthwise with a consequent actuation of the measuring roller and operation of the machine to operate the indicators and the price computing chart in unison. The price chart carries a series of computations for different lengths of goods which may be measured at the different prices per unit of measurement appearing on the members 28, and when a measurement is completed the clerk and customer both see the amount measured and the clerk by referring to the chart and the price per unit of the goods may immediately see the price of the goods bought without the necessity of computation.

The nut 36 moves to the front when the goods are drawn between the measuring and presser rollers and returns when the machine runs back to initial position after the mechanism is freed to do so. This nut actuates a stop member to interpose in the path of movement of a rotating part to stop the mechanism at initial zero position exactly and also absorb the shock of stoppage without impairing the mechanism in any manner. This stop mechanism is fully described and claimed in my prior patent and will be referred to but briefly here. A member 93 of substantial U-shape and a like member 94 are pivotally mounted on a rod 94ᵃ projecting to the rear from the post 3. A lug 93ª projects upwardly from the member 93 and enters a slot in the end of an arm 95 pivotally mounted at 96 on the upper end of the post 3 and formed with a finger 97 which lies in the path of movement of the pin 37 on nut 36. The springs shown connect the members 93 and 94 and the member 94 to a fixed portion of the machine frame serving normally to draw the member 94 out of the way of the rotating spring shock absorbing member 92 on the shaft 31 whenever the nut 37 is away from starting position. But when the nut returns to starting position, the pin 37 engaging against finger 97 turns lever 95 and with it the member 93 to a different position, the movement of said member 93 serving to draw the stop member 94 into a position that the member 92 strikes against the same, as in Fig. 8, stopping the machine at initial zero position, with the pointers and hand at zero and with the chart at zero position.

The construction described has proved practical in every way in service. It has numerous advantages which need not be enumerated here as fully set forth in my prior patent. The appended claims define the invention and it is to be considered that all forms of construction coming within the scope of said claims are comprehended by the invention.

I claim:

1. In a measuring machine including a frame, a measuring roller, indicating means and mechanism for driving said indicating means from the measuring roller, of a price computing unit comprising an open frame adapted to be detachably connected with said measuring machine frame and located above the same, two rollers mounted in the frame, a price chart wound on the rollers and adapted to unwind from one to the other, spring means tending to wind the chart onto one of the rollers, and a gear connected with the other roller adapted to be driven from the measuring mechanism with which the price chart computing unit is associated, substantially as described.

2. A price computing unit adapted to be detachably connected to and located above a measuring machine comprising a rectangular frame having spaced apart side and end members lying substantially in the same plane, two rollers mounted between the end members, a price chart attached to the rollers and adapted to unwind from one to the other, spring means associated with one of the rollers tending to automatically wind the chart on to said roller from the other roller, and a gear connected with said roller adapted to be driven by the measuring machine with which the unit is detachably associated, substantially as described.

3. A measuring machine for cloth or like material complete in itself and including a measuring roller and indicating means driven therefrom, and means for changing said measuring machine into a combined measuring and computing machine comprising a price computing unit complete in itself and including a price chart, said unit being detachably mounted upon said measuring machine and operated thereby and being freely and readily removable from said measuring machine, substantially as described.

4. In a machine of the class described, a measuring mechanism for cloth or like material including two separate indicating means for indicating units and fractions of units of measurement of cloth or like material passed through the machine, said separate indicating means being visible from different sides of the machine, and a price computing chart operatively connected with the mechanism for operation thereby and located in substantially the same plane with one of the said indicating means, substantially as described.

5. In a machine of the class described, a measuring mechanism for cloth or like material including two separate indicating means for indicating units and fractions of units of measurement of cloth passed through the machine, one of said indicating means being located in a vertical plane and visible from the front of the machine, and the other located in a horizontal plane and visible from above the machine, and a price computing chart operatively connected with the mechanism for operation thereby and positioned in a horizontal plane and visible from above the machine, substantially as described.

6. In a machine of the class described, a measuring mechanism for cloth or like material including two separate indicating means for indicating units and fractions of units of measurement of cloth passed through the machine, and a price computing chart operatively connected with said mechanism for operation thereby, said indicating means being located at different positions on the machine so as to be visible from different directions and said chart being visible from above the machine, substantially as described.

In testimony whereof I affix my signature.

ANTHONY VANDERVELD.